United States Patent [19]
Eriksson et al.

[11] Patent Number: 6,061,559
[45] Date of Patent: May 9, 2000

[54] SYSTEM AND METHOD FOR RECONNECTING A DISCONNECTED LOW PRIORITY CALL IN A MOBILE TELECOMMUNICATIONS NETWORK

[75] Inventors: Kurt-Erik Eriksson, Linköping; Lars Norman; Bo Gustafsson, both of Mjölby, all of Sweden

[73] Assignee: Telefonaktiebolaget L M Ericsson (publ), Stockholm, Sweden

[21] Appl. No.: 09/048,541

[22] Filed: Mar. 26, 1998

[51] Int. Cl.[7] .................................................. H04M 3/42
[52] U.S. Cl. .......................... 455/414; 455/436; 455/417; 455/450; 455/455
[58] Field of Search .................................... 455/433, 417, 455/436, 438, 442, 450, 455, 527; 379/266, 208; 370/455

[56] References Cited

U.S. PATENT DOCUMENTS

| | | | |
|---|---|---|---|
| 4,914,650 | 4/1990 | Sriram | 370/60 |
| 5,301,356 | 4/1994 | Bodin et al. | 455/436 |
| 5,406,616 | 4/1995 | Bjorndahl | 455/433 |
| 5,463,629 | 10/1995 | Ko | 370/110.1 |
| 5,497,504 | 3/1996 | Acampora et al. | 455/33.2 |
| 5,544,224 | 8/1996 | Jonsson et al. | 455/434 |
| 5,566,236 | 10/1996 | MeLampy et al. | 379/201 |
| 5,570,411 | 10/1996 | Sicher | 379/57 |
| 5,634,197 | 5/1997 | Paavonen | 455/512 |
| 5,666,364 | 9/1997 | Pierce et al. | 370/455 |
| 5,687,167 | 11/1997 | Bertin et al. | 370/254 |
| 5,812,656 | 9/1998 | Garland et al. | 379/208 |
| 5,943,334 | 8/1999 | Buskens et al. | 370/350 |

FOREIGN PATENT DOCUMENTS

| | | | |
|---|---|---|---|
| 0717579 | 6/1996 | European Pat. Off. | H04Q 7/38 |
| 0812118 | 12/1997 | European Pat. Off. | H04Q 7/22 |

*Primary Examiner*—Dwayne D. Bost
*Assistant Examiner*—Erika A. Gary
*Attorney, Agent, or Firm*—Jenkens & Gilchrist, P.C.

[57] ABSTRACT

A method and system used in a mobile telecommunications network for reconnecting at least one of a plurality of low priority calls that were disconnected due to preemption by high priority call(s) are disclosed. The system includes a queue for arranging the plurality of low priority calls. The system further includes a controller coupled to the queue for determining whether a traffic channel was located within a predetermined amount of time for use by the low priority call. The traffic channel may be located within one of a plurality of neighboring cells or within a current cell. If the traffic channel was located within the predetermined amount of time, then the controller will remove the low priority call from the queue and automatically reconnect the disconnected call using the located traffic channel.

28 Claims, 3 Drawing Sheets

SYSTEM AND METHOD FOR RECONNECTING A DISCONNECTED LOW PRIORITY CALL IN A MOBILE TELECOMMUNICATIONS NETWORK

BACKGROUND OF THE INVENTION

1. Technical Field of the Invention

The present invention generally relates to the mobile telecommunications field and, in particular, to a system and method for automatically reconnecting a disconnected low priority call.

2. Description of Related Art

It is well known that a mobile telecommunications network has a limited number of traffic channels that are used to complete end-to-end connections (air interfaces) between mobile terminal(s) and other users. Because of the limited number of traffic channels available, a mobile service provider, must choose a channel assignment scheme to manage and allocate the limited number of traffic channels. The mobile service provider's choice of a particular channel assignment scheme will, of course, have a direct impact on the performance of the mobile telecommunications network.

Channel assignment schemes can include a service known as "preemption". A preemption service is triggered when all of the traffic channels allocated to a cell are currently busy, and a request is received from within the same cell to use one of the busy traffic channels for a high priority call. Thereafter, the preemption service can forcefully terminate an established connection involving a low priority call in order to establish a connection for the high priority call using the newly seized traffic channel. The conventional preemption service is obviously undesirable to a mobile subscriber given the negative impact resulting from the forceful termination of the low priority call. The mobile service providers often classify calls involving speech or data transmission as having either a low priority or high priority. For example, mobile subscribers may pay a premium to have their calls classified by the provider as high priority.

FIG. 1 shows a time-line illustrating the operation of the conventional preemption service. Assuming all of the traffic channels associated with a cell are busy, then the conventional preemption service can be triggered when an end-to-end connection is in progress for a low priority call between a mobile terminal located in the cell and another user (time period "a"). And, then a channel request for a high priority call is received (timemark "b") causing the preemption service to initiate a first attempt to handover the low priority call to another traffic channel (time period "c"). If the first attempted handover is not successful, then a second attempt to handover the low priority call to another traffic channel may be undertaken by the preemption service (time period "d"). In the event either of the handover attempts are successful, then the low priority call will continue without interruption. However, if both handover attempts fail, then the low priority call will be disconnected (time mark "e") and the high priority call will be connected using the newly seized traffic channel. The duration of the first and second handover attempts (time periods "c" and "d") are determined by the mobile service provider.

Upon disconnection of the low priority call, the mobile subscriber of the disconnected call must actively try to reconnect the disconnected call using another traffic channel (fourth time period "f"). And, if the mobile subscriber is successful in reconnecting the disconnected call, then the call can continue barring another preemption until the mobile subscriber or other user affirmatively terminates the end-to-end connection (time period "g").

In addition to the possibility of having an ongoing call forcefully disconnected without notice, another problem associated with the current preemption service is that the mobile subscriber upon reconnecting a terminated data transmission call must reinitiate from the beginning any data transfer, since the previous call was interrupted. Also, problematic for the mobile service provider is the likelihood that the preempted mobile subscriber will try to re-establish another connection, which further aggravates the already congested situation within the mobile telecommunications network.

Accordingly, there is a need for a system and method to automatically reconnect a low priority call that has been forcefully terminated by a conventional preemption system. There is also a need for a system and method that automatically reconnects a terminated low priority call so that the users will not notice or hardly notice they were disconnected in the first place. Additionally, a system and method is needed that automatically reconnects a disconnected low priority call without interrupting an ongoing data transmission call. These and other needs are satisfied by the system and method of the present invention.

SUMMARY OF THE INVENTION

The present invention is a method and system used in a mobile telecommunications network for reconnecting at least one of a plurality of low priority calls that have been disconnected due to preemption by high priority call(s). The system includes a queue for arranging the plurality of low priority calls. The system further includes a controller coupled to the queue for determining whether a traffic channel was located within a predetermined amount of time for use by the low priority call. The traffic channel may be located within one of a plurality of neighboring cells or within a current cell. If the traffic channel was located within the predetermined amount of time, then the controller will remove the low priority call from the queue and automatically reconnect the disconnected call using the located traffic channel.

In accordance with the present invention a system and method are provided for automatically reconnecting a preemption-initiated disconnected low priority call.

Also in accordance with the present invention a system and method are provided to automatically reconnect a disconnected data transmission call without interrupting a data transmission call.

Further in accordance with the present invention a method and system are provided which have a special cause code for informing each user of a disconnected call to remain on the line while the system attempts to reconnect the call.

Also in accordance with the present invention a system and method are provided that will automatically reconnect a disconnected call in a manner where each user will hardly notice that there was a disconnection in the first place.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
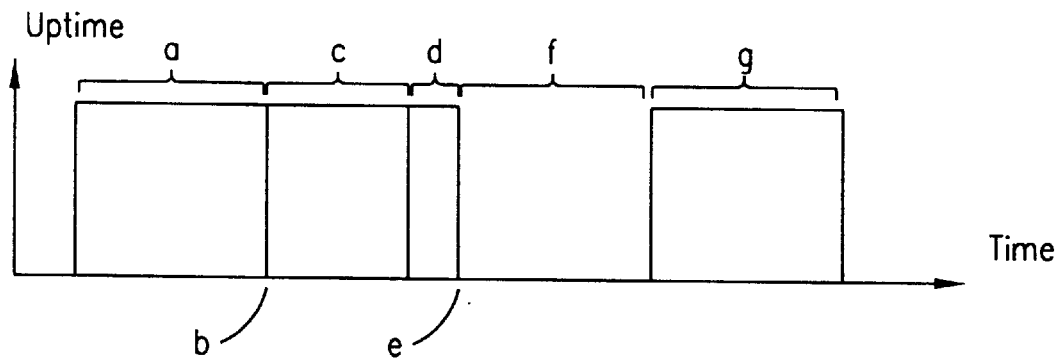
FIG. 1 is a time-line illustrating the operation of a conventional preemption service.
Figure 2:
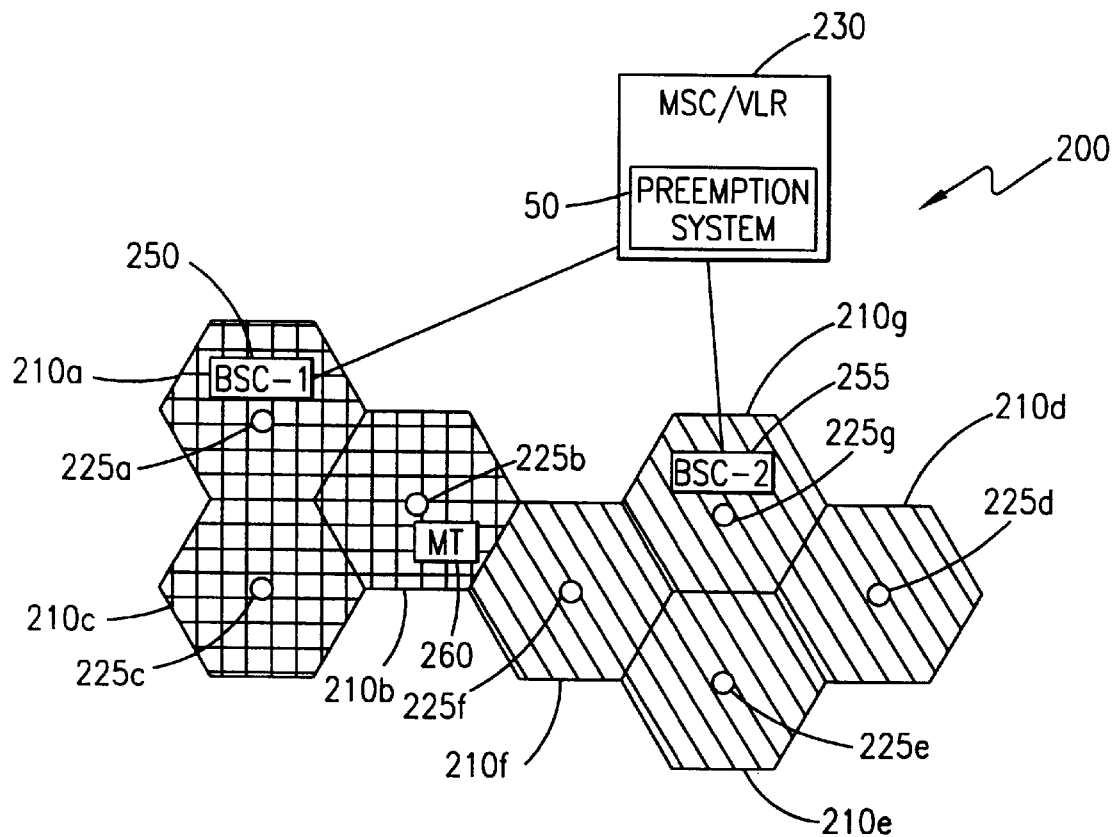
FIG. 2 is a block diagram of a mobile telecommunications network incorporating a preemption system in accordance with the present invention.
Figure 3:
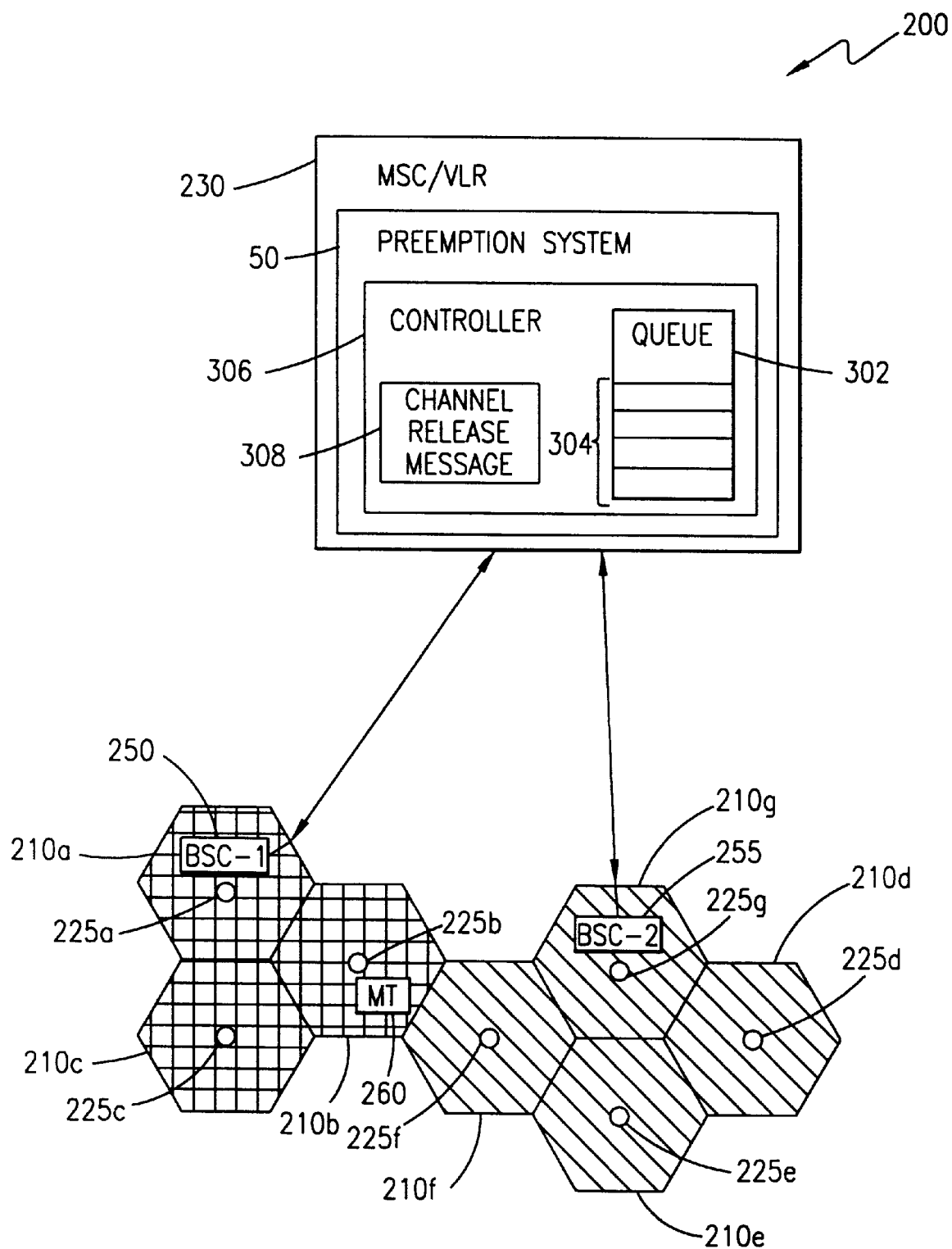
FIG. 3 is a block diagram illustrating in greater detail the preemption system shown in FIG. 2.
Figure 4:
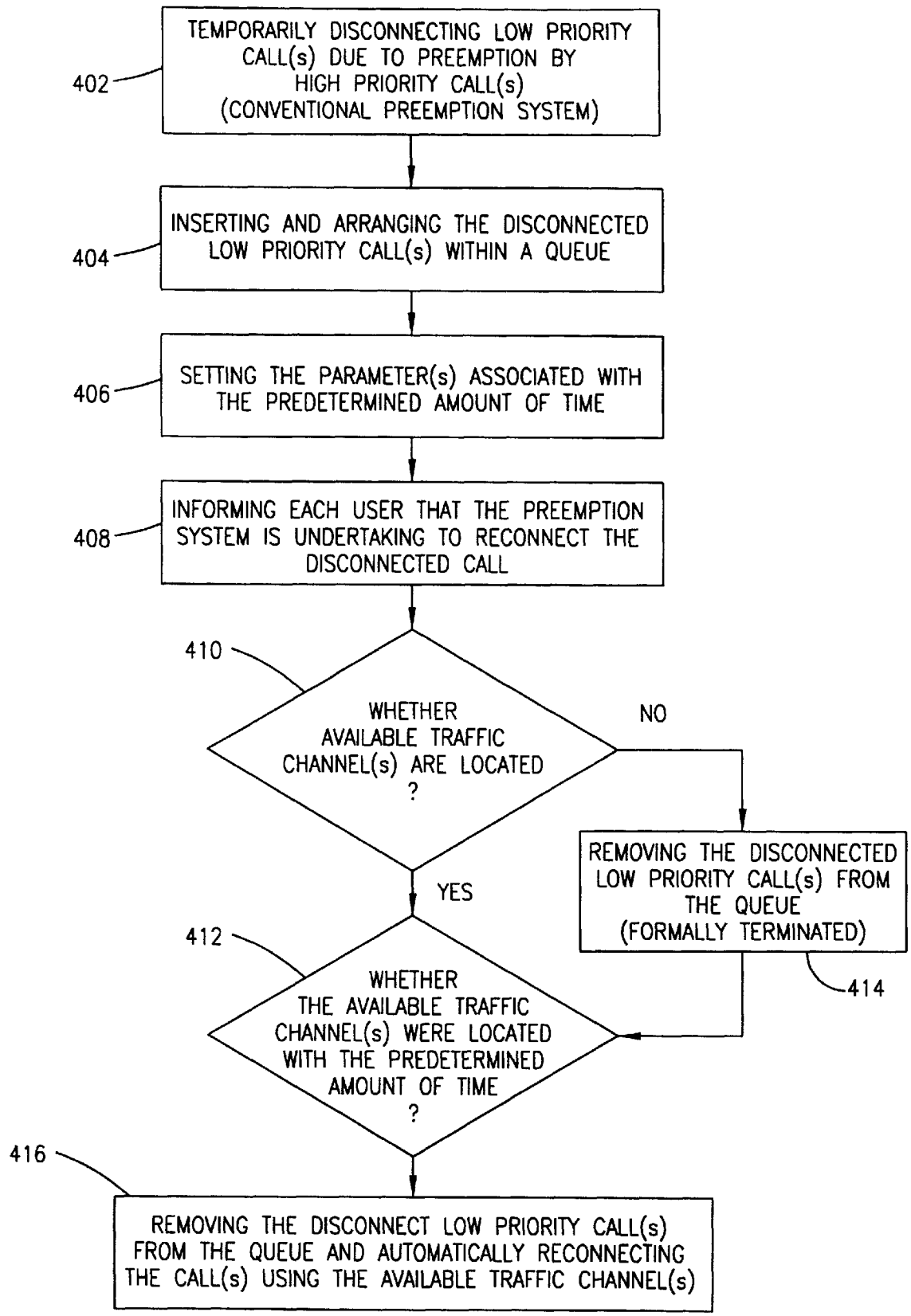
FIG. 4 is a simplified flow diagram of an operation of the preemption system shown in FIGS. 2 and 3.

Referring to the Drawings, wherein like numerals represent like parts throughout FIGS. 2–4, there is disclosed an exemplary preemption system 50, which can be used to implement a preferred embodiment of the present invention.

Although a mobile telecommunications network 200 embodying the preemption system 50 of the present invention will be discussed based on the Global System for Mobile Communications (GSM) specification, it should be understood that the GSM specification is only one of many specifications and standards that may utilize the principles of the present invention. Accordingly, the preemption system 50 described should not be construed in such a limited manner.

Referring to FIG. 2, there is illustrated a block diagram of the mobile telecommunications network 200 incorporating the exemplary preemption system 50. Excluding the preemption system 50, the general architecture of the mobile telecommunication network 200 is based substantially on the GSM specification.

The mobile telecommunications network 200 includes a plurality of cells 210a–210g that effectively divide an arbitrary geographic area into a plurality of contiguous radio coverage areas. A single base transceiver station (BTS) 225a–225g comprising transmitter and receiver antenna(s) (not shown) is positioned within each cell 210a–210g.

Different groups of neighboring cells (e.g., cells 210a–210c) are then associated with a particular base station controller (e.g., BSC-1 250). For example, the BSC-1 250 provides mobile service for cells 210a–210c, while the BSC-2 255 provides mobile service for cells 210d–210g. A number of BSCs (e.g., BSC-1 250 and BSC-2 255) may, in turn, be associated with and coupled to a mobile telephone switching office or a mobile services switching center/visitor location register (e.g., MSC/VLR 230). The MSC/VLR 230 generally functions as an interface between the mobile telecommunications network 200 and, for example, a public switched telephone network (PSTN) (not shown). The MSC/VLR 230 in addition to housing the preemption system 50 also functions to locate available traffic channels within each of the cells 210a–210g for use by the preemption system, as discussed in greater detail with reference to FIGS. 3 and 4. It should be understood that the preemption system 50 may also be housed within either of the BSCs 250 and 255.

First, a brief review of the conventional preemption service is provided in order to better describe the preferred embodiment of the preemption system 50. As discussed earlier, the conventional preemption service is triggered when all of the traffic channels allocated to a cell (e.g., 210b) are currently busy and a request by a high priority call to use one of the busy traffic channels is received from a mobile terminal 260 located within the same cell (e.g., 210b).

Upon receiving the request and prior to disconnecting any ongoing low priority call, the MSC/VLR 230 will attempt to handover one of the ongoing low priority calls to another available traffic channel that is available within one of the neighboring cells (e.g., 210a, 210c and 210f). If another traffic channel is available during the handover attempts, then the low priority call will be transferred to that traffic channel and the high priority call will be connected to the previously busy traffic channel. Otherwise, the conventional preemption service will forcefully terminate the ongoing low priority call and connect the high priority call to the newly seized traffic channel. As will be described, the preemption system 50 of the present invention operates to automatically reconnect the low priority call that was forcefully terminated by the conventional preemption system.

Referring to FIG. 3, there is shown a block diagram illustrating in greater detail the preemption system 50. The preemption system 50 generally includes a queue 302 for arranging the low priority call(s) 304 that have been disconnected to enable connections for high priority calls. The disconnected low priority call(s) 304 are typically inserted and removed from the queue 302 in a first-in-first-out order.

Prior to removing any of the disconnected low priority call(s) 304 from the queue 302 and reconnecting such call(s) 304, the mobile telecommunications system 200 and, more specifically, the MSC/VLR 230 first locates a corresponding number of traffic channel(s) that are available to be used by the disconnected low priority call(s). It is well known to those skilled in the art as to how the MSC/VLR 230 locates traffic channel(s), and as such the process of how the traffic channel(s) are located will not be described.

For clarity, assume the mobile terminal 260 having the disconnected low call 304 is located within the cell 210b. In such a situation the MSC/VLR 230 will attempt to locate an available traffic channel which is allocated to the same cell 210b, because other traffic channels that were previously busy within the same cell may have become available since the low priority call was disconnected. In addition, the MSC/VLR 230 may also attempt to locate an available traffic channel that is allocated to any one of the neighboring cells 210a, 210c and 210f. Of course, the preemption system 50 can effectively function for any number of mobile terminals having any number of disconnected low priority calls that are associated with the mobile telecommunications network 200.

The preemption system 50 further includes a controller 306 that interfaces with the queue 302. The controller 306 is used to determine whether or not the available traffic channel was located by the MSC/VLR 230 within a predetermined amount of time. The available channel should be located within the predetermined amount of time so that the users (e.g., subscribers) would not notice or hardly notice that their disconnected low priority call 304 was reconnected in the first place. The predetermined amount of time is generally a predefined parameter which is set at the cell level. Furthermore, there may be several parameter(s) having different durations associated with each of the disconnected low priority call(s) 304.

More specifically, prior to reconnecting a particular disconnected low priority call 304 using the available traffic channel, the controller 306 will compare the amount of time the particular call has been inserted on the queue 302 to the corresponding predetermined amount of time associated with that call. Thereafter, the controller 306 will remove the particular call 304 from the queue 302 and automatically reconnect the call using the newly located traffic channel, when the amount of time the particular call had been inserted onto the queue is less than the corresponding predetermined amount of time. On the other hand, when the amount of time the particular call 304 had been inserted onto the queue 302 is greater than the corresponding predetermined amount of time, then the controller 306 will finalize the termination of the particular call by removing the call from the queue. Of course, the disconnected low priority call(s) 304 can not be reconnected unless the MSC/VLR 230 had located traffic channel(s) that are available.

The controller 306 by automatically reconnecting the particular disconnected call 304 previously served by one of the cells (e.g., 210b) will in effect perform a handover to other cells (e.g., 210a–c) that are controlled by the same BSC (e.g., BSC-1 250). Such a handover is referred to as an intra-BSC handover. Also, the particular disconnected call 304 may be reconnected to an available traffic channel associated with another cell (e.g., 210f) which is controlled by another BSC (e.g., BSC-2 255). Such a process is in effect an inter-BSC handover. Finally, the handover associated with reconnection may occur between different MSCs (not shown). Such a handover is referred to as an inter-MSC handover. The handovers to other cells (e.g., 210a–c and 210f) may occur even though the mobile terminal 260 is still located within the original cell (e.g., 210b).

The controller 306 further includes a channel release message 308 having a special cause code for informing each user (not shown) of the particular disconnected low priority call 304 to remain on-line and not hang-up while the MSC/VLR 230 attempts to locate the available traffic channel within the predetermined amount of time. The special cause code may cause a mobile terminal 260 to emit a special tone alerting the user that a particular call 304 has been disconnected and may be automatically reconnected in the near future. Of course, it will be impossible to automatically reconnect the particular disconnected call 304 if any of the users hang-up or terminate their connection. The special cause code may be generally used for disconnected low priority call(s) 304 that are speech connections instead of data connections (e.g. High Speed Circuit Switched Data (HSCSD) Transmission calls).

Referring to FIG. 4, there is illustrated a simplified flow diagram of a method of operation for the exemplary preemption system 50. As discussed earlier, the operation of the preemption system 50 may be performed within the mobile telecommunications network 200 based on the GSM specification. However, other specifications or standards may be used such as, for example, the Advanced Mobile Phone System (AMPS), the Digital-Advanced Mobile Phone System (D-AMPS) and the Personal Digital Cellular (PDC) System.

Beginning at step 402, the preemption system 50 of the present invention will begin to operate after the low priority calls have already been forcefully disconnected by the conventional preemption system. The conventional preemption service has already been described above.

At step 404, the disconnected low priority call(s) 304 are then inserted within and arranged by the queue 302 (FIG. 3). The disconnected low priority call(s) 304 that are eventually reconnected may be removed from the queue 302 in a first-in-first-out order.

At step 406, the parameter(s) associated with the predetermined amount of time are set at the cell level by the controller 306. As mentioned earlier, the particular duration of the predetermined amount of time may be different for each of the disconnected low priority call(s) 304. Generally, the particular duration of time is set at a level so that users (e.g., subscribers) upon reconnection will hardly notice, if at all, that their low priority call 304 was temporarily disconnected in the first place.

At step 408, the preemption system 50 utilizes the special cause code to inform each user that their low priority call 304 was disconnected and to remain on-line while the preemption system 50 undertakes to reconnect the disconnected call.

At step 410, the MSC/VLR 230 then attempts to locate available traffic channel(s) by scanning for any traffic channel(s) that are currently available within the same cell (e.g., 210b) which previously serviced the low priority call, or within the neighboring cells (e.g., 210a, 210c and 210f). In the event available traffic channel(s) are located, then at step 412 the controller 306 will determine if the available traffic channel(s) were located within the predetermined amount of time.

At step 414, if the available traffic channel(s) are not located, or the traffic channel(s) were located after the predetermined amount of time had passed, then the particular disconnected call(s) 304 are removed from the queue 302 and formally terminated.

Otherwise, if the MSC/VLR 230 was successful in locating the available traffic channel(s) within the corresponding predetermined amount of time, then at step 416 the particular disconnected call(s) 304 are removed from the queue 302 and automatically reconnected using the newly located traffic channel(s).

From the foregoing, it can be readily appreciated by those skilled in the art that the present invention provides a preemption system and method for use in a mobile telecommunications network that automatically reconnects a low priority call that was forcefully disconnected by a conventional preemption system. Also, the preemption system as disclosed may be used to automatically reconnect a disconnected call in a manner where each user will hardly notice they were disconnected in the first place. Furthermore, the disclosed preemption system may be used to reconnect a data transmission call that was forcefully terminated, without interrupting the data transmission call.

Although one embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A preemption system used in a mobile telecommunications network for reconnecting at least one of a plurality of disconnected low priority calls that have been disconnected due to preemption by a plurality of high priority calls, said preemption system comprising:

a queue for arranging the plurality of disconnected low priority calls, each low priority call was disconnected to enable one high priority call to use a seized traffic channel previously used by one low priority call; and a controller coupled to the queue for determining whether a traffic channel was located in a predetermined amount of time within one of a plurality of neighboring cells or within a current cell and for removing the at least one low priority call from said queue and automatically reconnecting the at least one low priority call using the located traffic channel, provided the traffic channel was located within the predetermined amount of time.

2. The preemption system of claim 1, wherein the controller includes means for removing the at least one low priority call from the queue if the traffic channel was not located within the predetermined amount of time.

3. The preemption system of claim 1, wherein said controller further includes a channel release message having a special cause code for informing each user of the plurality of low priority calls to remain on-line.

4. The system of claim 1, wherein the plurality of low priority calls includes a data transmission call and voice call.

5. The preemption system of claim 1, wherein the at least one disconnected low priority call is automatically reconnected without interrupting an ongoing data transmission call.

6. The preemption system of claim 1, wherein the predetermined amount of time for locating the traffic channel to be used by the at least one disconnected low priority call is adjustable for each disconnected low priority call.

7. A mobile telecommunications network comprising:
a location register for locating an available channel; and
a preemption system coupled to the location register for reconnecting at least one of a plurality of low priority calls that have been disconnected due to preemption by a plurality of high priority calls, said preemption system including:
a queue for arranging the plurality of disconnected low priority calls, each low priority call was disconnected to enable one high priority call to use a seized traffic channel Previously used by one low priority call; and
a controller coupled to the queue for determining whether the location register located the available channel within a predetermined amount of time, and for removing the at least one queued low priority call from the queue and automatically reconnecting the at least one low priority call using the available channel if the available channel was located by the location register within the predetermined amount of time.

8. The mobile telecommunications network of claim 7, wherein said controller includes means for removing the low priority call from the queue when the location register fails to locate the available channel within the predetermined amount of time.

9. The mobile telecommunications network of claim 7 wherein said controller further includes a channel release message having a special cause code for informing each user of the queued low priority call to remain on-line while the location register attempts to locate the available channel.

10. The mobile telecommunications network of claim 7, wherein the location register includes a mobile services switching center.

11. The mobile telecommunications network of claim 7, wherein the low priority call includes a data transmission call.

12. The mobile telecommunications network of claim 11, wherein the low priority call includes a High Speed Circuit Switched Data Transmission call.

13. The mobile telecommunications network of claim 7, wherein the low priority call includes a speech call.

14. The mobile telecommunications network of claim 7, wherein the available channel includes a traffic channel located within one of a plurality of neighboring cells or within a current cell.

15. The mobile telecommunications network of claim 7, wherein the predetermined amount of time includes a predefined parameter set at a cell level.

16. The mobile telecommunications network of claim 7, wherein the at least one disconnected low priority call is automatically reconnected without interrupting an ongoing data transmission call.

17. The mobile telecommunications network of claim 7, wherein the predetermined amount of time for locating the traffic channel to be used by the at least one disconnected low priority call is adjustable.

18. A method used in a mobile telecommunications network for reconnecting at least one of a plurality of low priority calls that have been disconnected due to preemption by a plurality of high priority calls, said method comprising the steps of:
queuing the plurality of disconnected low priority calls, each low priority call was disconnected to enable one high priority call to use a seized traffic channel previously used by one low priority call;
attempting to locate an available traffic channel for use by the at least one queued low priority call;
removing the at least one queued low priority call; and
automatically reconnecting the at least one low priority call when the attempt to locate the available traffic channel was successful within a predetermined amount of time.

19. The method of claim 18, further comprising the step of removing the queued low-priority call when the attempt to locate the available traffic channel was not successful within the predetermined amount of time.

20. The method of claim 18, further comprising the step of informing each user of the queued low priority call to not hang-up while attempting to located the available traffic channel.

21. The method of claim 18, wherein the step of automatically reconnecting the low priority call includes connecting a data transmission call.

22. The method of claim 18, wherein the step of automatically reconnecting the low priority call includes connecting a voice transmission call.

23. The method of claim 18, wherein the step of attempting to locate an available traffic channel includes searching for the available traffic channel within a current cell or within a plurality of neighboring cells.

24. The method of claim 18, further comprising the step of setting the predetermined amount of time within a parameter at a cell level.

25. The method of claim 18, wherein the step of automatically reconnecting the at least one low priority call includes connecting a data transmission call without interrupting the data transmission call.

26. The method of claim 18, wherein the predetermined amount of time for locating the traffic channel to be used by the at least one disconnected low priority call is adjustable.

27. A method for providing a preemption service within a mobile telecommunications network, said method comprising the steps of:
receiving a request from a high priority call to use a traffic channel when at least one of a plurality of traffic channels is currently being used by a low priority call;
seizing one of the traffic channels being used by the low priority call;
connecting the high priority call using the seized traffic channel;
disconnecting and queuing the low priority call;
attempting to locate an available traffic channel for use by the queued low priority call;
removing the queued low priority call; and
automatically reconnecting the low priority call when the attempt to locate the available traffic channel was successful within a predetermined amount of time.

28. The method of claim 27, further comprising the step of attempting to handover the low priority call to another available traffic channel prior to disconnecting the low priority call.

* * * * *